(12) United States Patent
Nishino (10) Patent No.: US 8,838,746 B2
(45) Date of Patent: Sep. 16, 2014

(54) INFORMATION PROCESSING APPARATUS, A COMPUTER-READABLE STORAGE MEDIUM RECORDED WITH A DATA MANAGEMENT PROGRAM, AND DATA MANAGEMENT SYSTEM

(75) Inventor: Tetsuya Nishino, Osaka (JP)

(73) Assignee: Kyocera Mita Corporation, Osaka-shi (JP)

( * ) Notice: Subject to any disclaimer, the term of this patent is extended or adjusted under 35 U.S.C. 154(b) by 486 days.

(21) Appl. No.: 12/891,833

(22) Filed: Sep. 28, 2010

(65) Prior Publication Data

US 2011/0078286 A1 Mar. 31, 2011

(30) Foreign Application Priority Data

Sep. 29, 2009 (JP) ................................. 2009-225153

(51) Int. Cl.
G06F 15/16 (2006.01)
G06F 15/173 (2006.01)
H04L 12/28 (2006.01)
G06F 9/44 (2006.01)
H04N 1/00 (2006.01)

(52) U.S. Cl.
CPC .... H04N 1/00127 (2013.01); H04N 2201/0084 (2013.01); H04N 2201/0027 (2013.01); H04N 2201/0094 (2013.01); H04N 1/00344 (2013.01); H04N 1/00244 (2013.01)
USPC ........... 709/219; 709/223; 709/224; 370/389; 717/115

(58) Field of Classification Search
CPC ................................................ H04L 29/08072
USPC ............ 709/217–229, 246; 307/389; 717/115
See application file for complete search history.

(56) References Cited

U.S. PATENT DOCUMENTS

| 7,265,857 | B1 * | 9/2007 | Murata | 358/1.15 |
|---|---|---|---|---|
| 7,478,124 | B2 * | 1/2009 | Huang | 709/203 |
| 2002/0083169 | A1 * | 6/2002 | Aki et al. | 709/224 |
| 2002/0133564 | A1 | 9/2002 | Takayama | |
| 2002/0174223 | A1 * | 11/2002 | Childers et al. | 709/224 |
| 2004/0093317 | A1 * | 5/2004 | Swan | 707/1 |
| 2005/0097198 | A1 * | 5/2005 | Getler et al. | 709/223 |
| 2005/0223356 | A1 * | 10/2005 | Kanchi | 717/115 |
| 2006/0098650 | A1 * | 5/2006 | Beninato et al. | 370/389 |
| 2007/0064113 | A1 * | 3/2007 | Lee | 348/207.99 |
| 2007/0073902 | A1 * | 3/2007 | Miyahara et al. | 709/246 |
| 2010/0103443 | A1 * | 4/2010 | Hwangbo | 358/1.13 |

FOREIGN PATENT DOCUMENTS

| JP | 2002-373221 | 12/2002 |
|---|---|---|
| JP | 2003-177988 | 6/2003 |
| JP | 2007-122641 | 5/2007 |

* cited by examiner

*Primary Examiner* — Ian Moore
*Assistant Examiner* — Kiet Tang
(74) *Attorney, Agent, or Firm* — Gerald E. Hespos; Michael J. Porco; Matthew T. Hespos (57) ABSTRACT

A server computer includes a data acquisition unit which acquires data in Script format including predetermined information that has been output from each of one or more network-connected peripheral devices, a tabulation unit which extracts maintenance information from the Script format data acquired by the data acquisition unit, and tabulates this extracted maintenance information, and a data conversion unit which converts the tabulated information that has been tabulated by the tabulation unit into a data format which is interpretable by a device that is different from the server computer and which is different from the Script format.

5 Claims, 8 Drawing Sheets

INFORMATION PROCESSING APPARATUS, A COMPUTER-READABLE STORAGE MEDIUM RECORDED WITH A DATA MANAGEMENT PROGRAM, AND DATA MANAGEMENT SYSTEM

BACKGROUND OF THE INVENTION

1. Field of the Invention

The present invention relates to an information processing apparatus, a data management program, and a data management system, and in particular relates to technology of tabulating prescribed information that has been output from a network-connected peripheral device.

2. Description of the Related Art

Conventionally, known is an image forming system configured from one or more image forming apparatuses, and a server computer and a client computer that are network-connected to the image forming apparatuses. With this image forming system, the image forming apparatuses, the server computer, and the client computer are able to mutually communicate data, and the image forming apparatuses print out the data that was sent from the client computer or the server computer.

SUMMARY OF THE INVENTION

The present invention is an improvement of the foregoing conventional invention.

Specifically, the present invention is an information processing apparatus including a data acquisition unit which acquires data in Script format including predetermined information that has been output from each of one or more network-connected peripheral devices, a tabulation unit which extracts the predetermined information from the Script format data acquired by the data acquisition unit, and tabulates this extracted information, and a data conversion unit which converts the tabulated information that has been tabulated by the tabulation unit into a predetermined data format which is interpretable by a device that is different from the information processing apparatus and which is different from the Script format.

DETAILED DESCRIPTION OF THE PREFERRED EMBODIMENTS

The information processing apparatus, the data management program, and the data management system according to an embodiment of the present invention are now explained with reference to the attached drawings.

Figure 1:
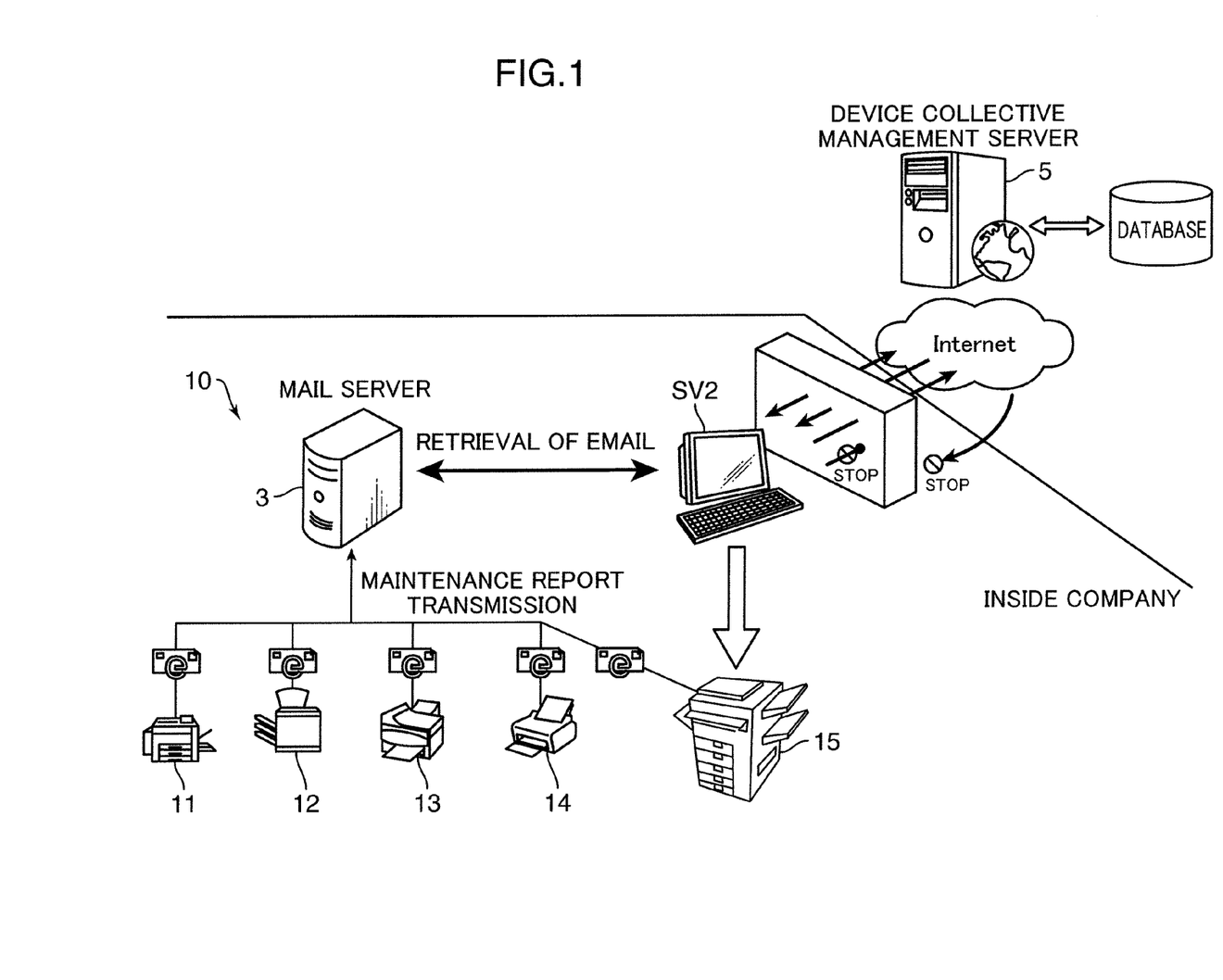
FIG. 1 is a diagram showing an example of the data management system according to an embodiment of the present invention.

FIG. 1 is a diagram showing an example of the data management system according to an embodiment of the present invention. The data management system 10 is configured from one or more image forming apparatuses 11 to 15, a server computer SV2, and a mail server 3. However, the number of image forming apparatuses, server computers, and mail servers to be equipped in the data management system 10 is not limited to the above.

The image forming apparatuses 11 to 14 are a printer, a copy machine, or a facsimile machine. The image forming apparatus 15 is a multifunction peripheral and comprises multiple functions; for instance, a copy function, a facsimile function, a printer function, and a scanner function. The image forming apparatus 15 comprises a document management function of storing the document data of the manuscript that was read with the scanner unit in the internal storage device of the image forming apparatus 15, the server computer SV2 that is network-connected to the image forming apparatus 15 via a LAN (local area network) or the like, a storage unit in a personal computer not shown, and reading print target data that is stored in the internal storage device of the image forming apparatus 15, the server computer SV2, and the storage unit of the personal computer and printing out the same. The image forming apparatus 15 is provided with a display unit 50 (FIG. 3) configured from an LCD (Liquid Crystal Display) or the like. Moreover, the image forming apparatuses 11 to 15 respectively comprise a function for acquiring and storing maintenance information such as the toner level (in other words, toner residual quantity), copy count information (in other words, the information counted the copy number of sheets), and jam count (in other words, the number of times that produced jam) during the image forming operation. The image forming apparatuses 11 to 15 create Script format data including the foregoing maintenance information, and, in this embodiment, send the Script format data including the maintenance information to the mail server 3 in email format.

The mail server 3 includes a function as a SMTP server and a POP server. The mail server 3 sends and receives email to and from the LAN-connected image forming apparatuses 11 to 15 and the server computer SV2. In addition, the mail server 3 is connected to the internet via a router not shown, and includes a function of sending and receiving emails to and from the device collective management server 5 via the internet.

The server computer SV2 acquires Script format data including the foregoing maintenance information that is output from the respective image forming apparatuses 11 to 15 via the foregoing mail server 3, and extracts and tabulates the maintenance information from the Script format data as predetermined information to obtain tabulated information. The server computer SV2 is able to convert the tabulated information made of the Script format data into, for example, screen data in HTML format data (hereinafter referred to as the "display screen data") of a display screen that is displayed on the display unit 50 of the image forming apparatus 15. The image forming apparatus 15 receives the foregoing screen data to be displayed on the display unit 50 from the server computer SV2, and displays the screen data on the display unit 50. Moreover, the server computer SV2 is able to convert the tabulated information made of the foregoing Script format data into a data format that is interpretable by the device collective management server 5 (for instance, HTML data format, Prescribe data, PJL (Printer Job Language) and the like; provided, however, that the data format that is interpretable by the device collective management server 5 is not limited to the above).

The device collective management server 5 receives the foregoing tabulated information in email format or the like from the server computer SV2 and the mail server 3 of the respective data management systems 10 of the respective installation sites (organizations such as companies and business offices) where the data management system 10 as the management target is installed. Ideally, the data management system 10 of the respective installation sites is protected via a firewall or the like during the data transmission and reception with the outside via the internet.

Figure 2:
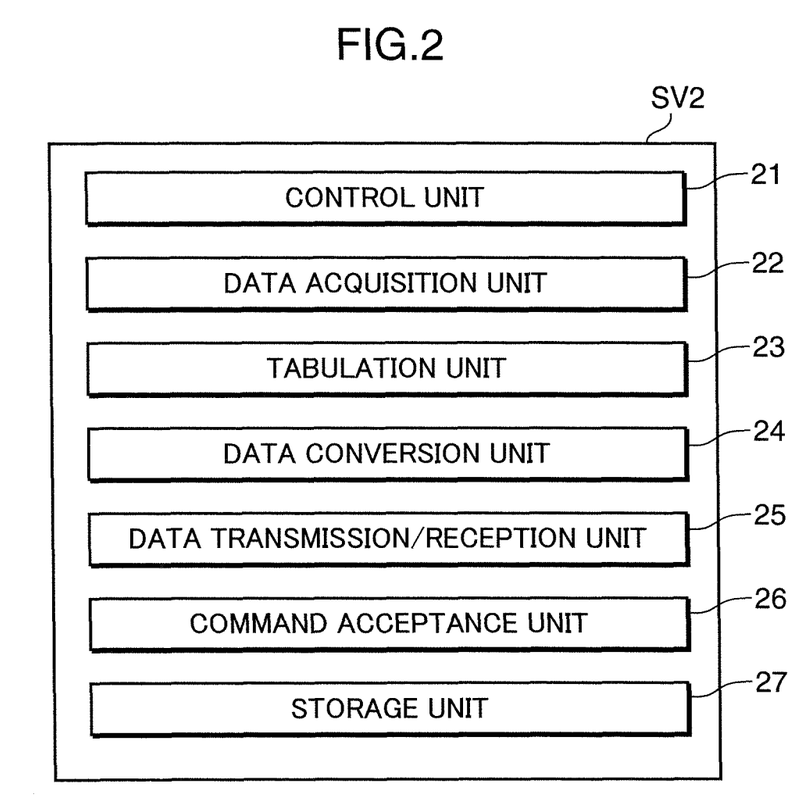
FIG. 2 is a block diagram showing a schematic configuration of the server computer.

The configuration of the server computer SV2 is now explained. FIG. 2 is a block diagram showing a schematic configuration of the server computer SV2.

The server computer SV2 comprises a control unit 21, a data acquisition unit 22, a tabulation unit 23, a data conversion unit 24, a data transmission/reception unit 25, a command acceptance unit 26, and a storage unit 27.

The control unit 21 is configured from a CPU or the like, and governs the overall operational control of the server computer SV2. The control unit 21 controls the respective processes to be performed by the server computer SV2 based on the operator's command that was accepted by the command acceptance unit 26.

The data acquisition unit 22 acquires the Script format data including the maintenance information that was output from the respective image forming apparatuses 11 to 15 which are network-connected to the server computer SV2. In this embodiment, the data acquisition unit 22 receives and acquires the foregoing Script format data in email format via the mail server 3.

The tabulation unit 23 extracts the maintenance information from the foregoing Script format data acquired by the data acquisition unit 22, and tabulates this extracted maintenance information. For example, the tabulation unit 23 extracts the maintenance information from the foregoing Script format data, and calculates the tabulation result of the toner level, copy count information, jam count and the like for each of the image forming apparatuses 11 to 15, and calculates the tabulation result of the toner level, copy count information, jam count and the like regarding all network-connected image forming apparatuses 11 to 15.

The data conversion unit 24 converts the tabulated information that was tabulated with the tabulation unit 23 into a predetermined data format (for instance, HTML data format, Prescribe data, PJL (Printer Job Language) and the like; provided, however, that the data format that is interpretable by the device collective management server 5 and the image forming apparatus 15 is not limited to the above) which can be interpreted by an apparatus that is different from the server computer SV2 (in this embodiment, the device collective management server 5 and the image forming apparatus 15) and which is different from the Script format.

The data transmission/reception unit (an example of the data transmission unit in the claims) 25 transmits and receives various types of data to and from the mail server 3 and the image forming apparatuses 11 to 15. The data transmission/reception unit 25 transmits the foregoing data that was converted with the data conversion unit 24 to the device collective management server 5, the image forming apparatus 15 and the like. Moreover, the data transmission/reception unit 25 determines whether data transmission to a predetermined peripheral device (in this embodiment, the image forming apparatus 15) is possible, and if it is determined that data transmission to the image forming apparatus 15 is possible, it transmits the tabulated information made of the foregoing converted HTML format data to a predetermined different image forming apparatus including the foregoing display unit 50 among the other network-connected image forming apparatuses 11 to 14.

The command acceptance unit 26 receives from an operator an input of a command for selecting whether to perform the data conversion with the data conversion unit 24 and the data transmission with the data transmission/reception unit 25. For example, the command acceptance unit 26 receives the respective operation commands input as a result of the operator operating an operation unit (mouse pointer, keyboard or the like) not shown that is provided to the server computer SV2. If the command acceptance unit 26 accepts a command for performing the foregoing data conversion and the data transmission, the control unit 21 causes the data conversion unit 24 to perform data conversion and the data transmission/reception unit 25 to perform data transmission, and causes the data conversion unit 24 to refrain from performing data conversion and the data transmission/reception unit 25 to refrain performing data transmission if the command acceptance unit 26 does not accept the foregoing command.

The storage unit 27 is configured from an HDD or the like, and stores the data management program according to an embodiment of the present invention. The control unit 21 functions as the control unit 21, the data acquisition unit 22, the tabulation unit 23, the data conversion unit 24, the data transmission/reception unit 25, and the command acceptance unit 26 equipped with each of the foregoing functions by running according to the data management program stored in the storage unit 27. The data management program according to an embodiment of the present invention is recorded in a computer-readable storage medium, and is read from the foregoing storage medium and stored in the storage unit 27 via an interface not shown.

Figure 3:
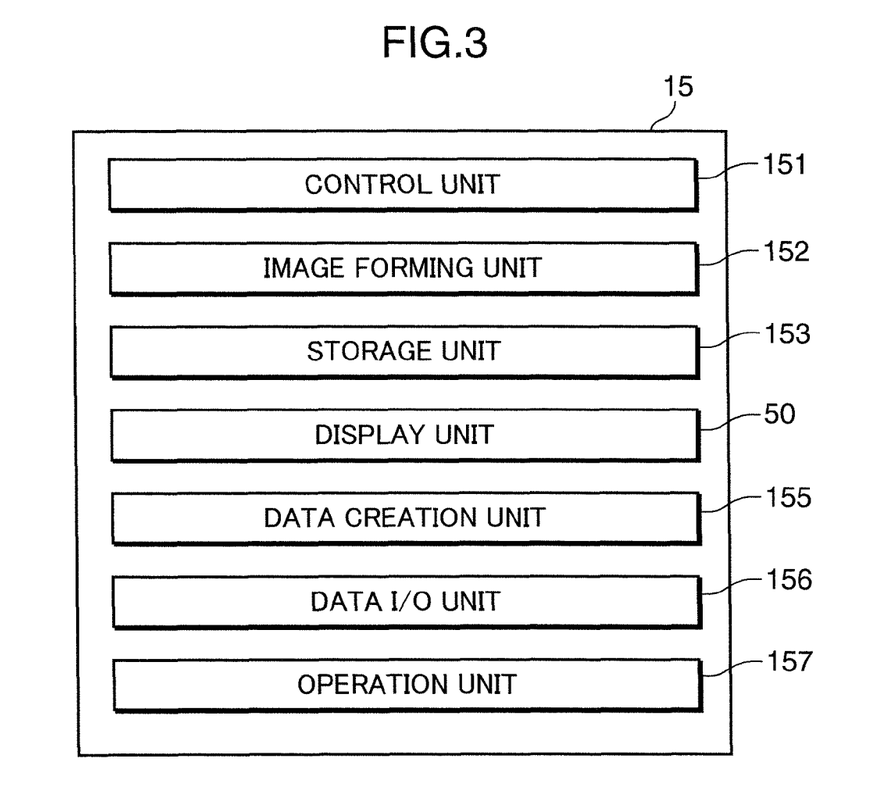
FIG. 3 is a block diagram showing a schematic configuration of the image forming apparatus.

The configuration of the image forming apparatus 15 is now explained. FIG. 3 is a block diagram showing a schematic configuration of the image forming apparatus 15. The image forming apparatuses 11, 12, 15 comprise a display unit 50, and the image forming apparatuses 13, 14 differ in that they do not comprise the display unit 50, the control unit including the function of the display control unit, and the data I/O unit including the function of the data receiving unit, but the remaining configuration is the same as the image forming apparatuses 11 to 15.

The image forming apparatus 15 comprises a control unit 151, an image forming unit 152, a storage unit 153, a display unit 50, a data creation unit 155, a data I/O unit 156, and an operation unit 157.

The control unit 151 governs the overall operational control of the image forming apparatus 15. The control unit (display control unit) 151 displays, on the display unit 50, the tabulated information made of the foregoing HTML format data that was received from the server computer SV2 by the data I/O unit 156.

The image forming unit 152 performs image forming operations based on the print data in an electrophotographic format or an inkjet format. In the case of an electrophotographic format, the image forming unit 152 comprises a photoreceptor drum, a charging device, an exposure device, a development device, a transcription device, a neutralization device and the like.

During the execution of the image forming operation by the image forming unit 152, the data creation unit 155 acquires the foregoing maintenance information such as the toner level, copy count information, and jam count from the control unit 151 that controls the image forming unit 152 and a feeding mechanism of a manuscript or recording paper not shown and converts it into Script format data as the maintenance information to be sent to the server computer SV2.

The data I/O unit 156 transmits and receives various types of data to and from the mail server 3, the server computer SV2 and the like. In this embodiment, the data I/O unit 156 transmits the Script format data including the maintenance information created with the data creation unit 155 to the server computer SV2 via the mail server 3. Moreover, the data I/O unit 156 receives the tabulated information made of the foregoing HTML format data that is transmitted from the server computer SV2.

The storage unit 153 is configured from a memory or the like, and stores the Script format data including the maintenance information created with the foregoing data creation unit 155, image forming target data, and the like.

The operation unit 157 is an operation button and the like that are provided to the front face of the main body of the image forming apparatus 15, and the operator inputs into the operation unit 157 an image forming operation execution command or a command for displaying the tabulated information received by the data I/O unit 156 on the display unit 50 based on the operator's operation.

The display unit 50 is configured from an LCD or the like, and displays the tabulated information that was received by the data I/O unit 156 under the control of the control unit 151.

Figure 4:
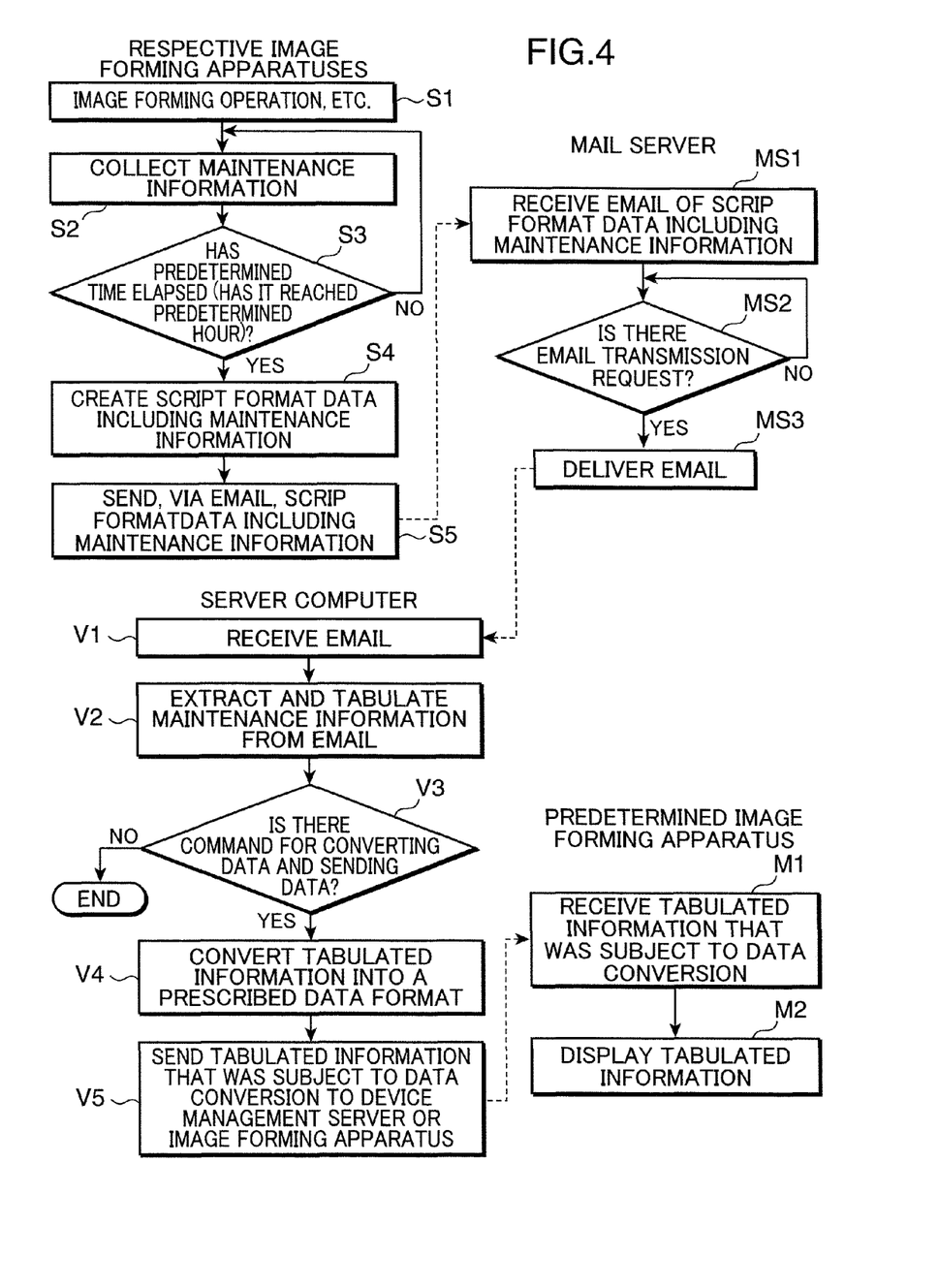
FIG. 4 is a flowchart showing the first embodiment of the data management processing according to the data management system.

The first embodiment of the data management processing to be performed by the data management system 10 is now explained. FIG. 4 is a flowchart showing the first embodiment of the data management processing to be performed by the data management system 10.

When the image forming unit 152 in the respective image forming apparatuses 11 to 15 performs the image forming operation (S1), the data creation unit 155 acquires maintenance information such as the toner level, copy count information, and jam count and stores it in the storage unit 153 (S2). The control unit 151 continues the maintenance information acquisition processing until a predetermined time (for instance, one hour) elapses based on a built-in timer, and, when it is determined that the foregoing predetermined time has elapsed (YES at S3), the data creation unit 155 uses the foregoing maintenance information stored in the storage unit 153 at such time and creates Script format data as the maintenance information to be sent to the server computer SV2 (S4). When the Script format data including the maintenance information is created by the data creation unit 155, the data I/O unit 156 uses the email address of the server computer SV2 as the email address showing the destination of the Script format data, and sends the Script format data to the mail server 3 via email (S5).

When the mail server 3 receives the email of the Script format data including the maintenance information from one of the image forming apparatuses 11 to 15, it stores the email in its built-in storage unit (MS1). Here, if there is a command from the server computer SV2 to the effect of requesting the sending of an email to the server computer SV2's own address (YES at MS2), the mail server 3 sends an email of the Script format data including the maintenance information stored in the built-in storage unit and which is the email received from the respective image forming apparatuses 11 to 15 to the server computer SV2 (MS3).

In the server computer SV2, when the data acquisition unit 22 receives the foregoing email from the mail server 3 (V1), the tabulation unit 23 extracts the toner level, copy count information, jam count and the like as the maintenance information made of Script format data from the received email, and calculates the tabulation result of the toner level, copy count information, jam count and the like for each of the image forming apparatuses 11 to 15 as well as the tabulation result of all image forming apparatuses 11 to 15, and stores them in the storage unit 27 (V2). Note that the foregoing tabulation method is merely an example, and the tabulation method according to the present invention is not limited to the above.

Here, the control unit 21 determines whether the operator configured a setting for converting the foregoing tabulated information into a prescribed data format and sending it to the device collective management server 5 or the image forming apparatus 15 (V3). Here, let it be assumed that the command acceptance unit 26 accepts a command for setting the image forming apparatus 15 as the destination of the foregoing tabulated information as a result of the operator operating the operation unit (mouse pointer or keyboard) not shown, and the image forming apparatus 15 is preliminarily set as the destination of the foregoing tabulated information.

If there is no setting for converting the foregoing tabulated information into a prescribed data format and sending it to the device collective management server 5 or the image forming apparatus 15 (NO at V3), the control unit 21 ends the processing. Specifically, the maintenance information made of the foregoing Script format data is stored as tabulated information in the storage unit 27 of the server computer SV2, and the processing is ended.

Meanwhile, if the command acceptance unit 26 is configured with a setting for converting the foregoing tabulated information into a prescribed data format and sending it to the device collective management server 5 or the image forming apparatus 15 (YES at V3), the data conversion unit 24 converts the tabulated information made of the foregoing Script format data into, for example, HTML data format, Prescribe data, PJL (Printer Job Language) or the like according to the contents of the set command (V4). Specifically, if the operator configured a setting for sending the foregoing tabulated information to the device collective management server 5, the data conversion unit 24 converts the tabulated information made of the foregoing Script format data into, for example, HTML data format, Prescribe data, PJL (Printer Job Language) or the like. If the operator configured a setting for sending the foregoing tabulated information to the image forming apparatus 15, the data conversion unit 24 converts the tabulated information made of the foregoing Script format data into, for example, HTML format data. Moreover, if the operator configured a setting for sending the foregoing tabulated information to both the device collective management server 5 and the image forming apparatus 15, the data conversion unit 24 converts the tabulated information of the foregoing Script format data into, for example, HTML data format, Prescribe data, PJL (Printer Job Language) or the like.

Subsequently, the data transmission/reception unit 25 sends the foregoing data converted tabulated information to the device collective management server 5 and/or the image forming apparatus 15 according to the contents of the foregoing command (V5).

In the image forming apparatus 15, if the data I/O unit 156 receives the tabulated information made of the HTML format data (M1), the control unit 151 displays the received tabulated information made of the HTML format data on the display unit 50 (M2).

Consequently, the image forming apparatus 15 is also able to manage the logs of the toner level, copy count information, jam count and the like regarding all network-connected image forming apparatuses 11 to 15 by using the foregoing tabulated information.

If the device collective management server 5 receives the tabulated information made of the predetermined format data, the control unit (not shown) of the device collective management server 5 stores the tabulated information in the database 51.

Figure 5:
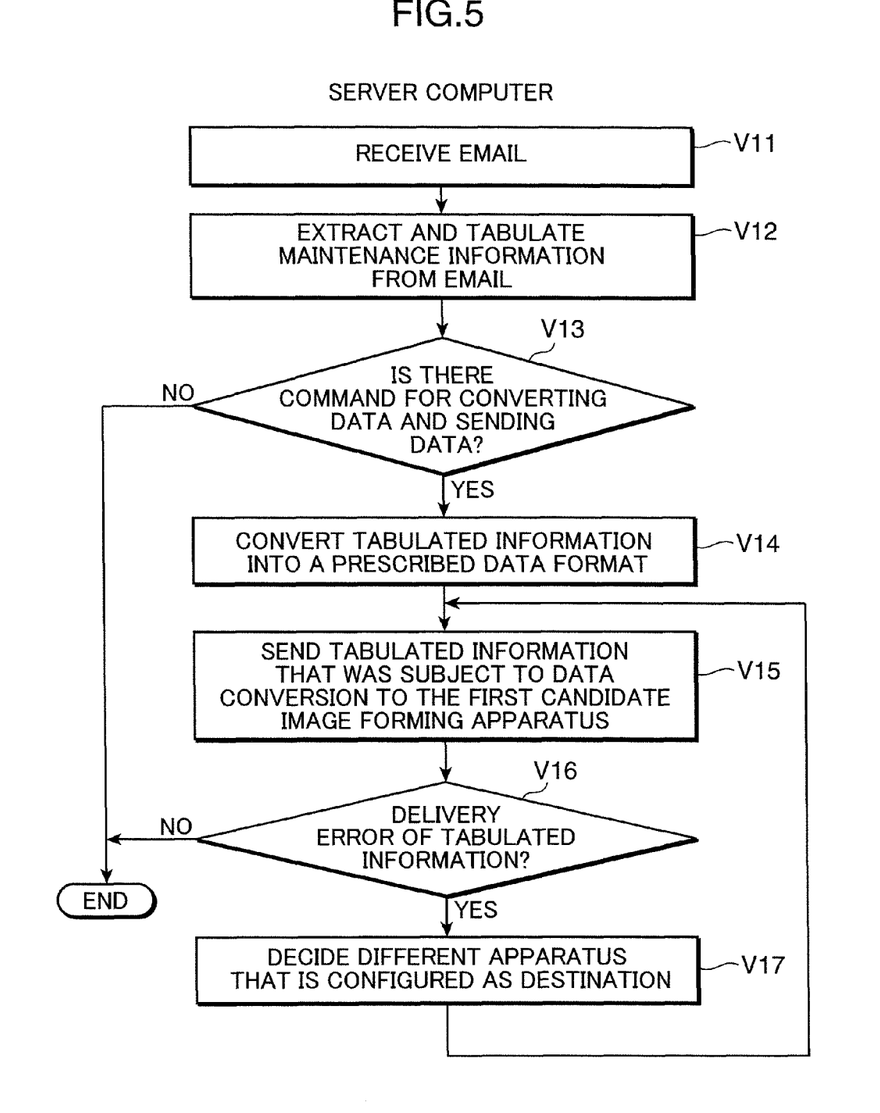
FIG. 5 is a flowchart showing the second embodiment of the data management processing according to the data management system.

The second embodiment of the data management processing to be performed by the data management system 10 is now explained. FIG. 5 is a flowchart showing the second embodiment of the data management processing to be performed by the data management system 10. In the second embodiment, explanation and illustration of the processing performed by the respective image forming apparatuses 11 to 15 and the processing performed by the mail server 3, which are the same as the processing of the first embodiment explained with reference to FIG. 4 are omitted, and only the processing to be performed by the server computer SV2 is illustrated. In addition, explanation of the processing performed by the server computer SV2 that is the same as the processing of the first embodiment is also omitted.

In the second embodiment, the command acceptance unit 26 is able to accept the image forming apparatus as the destination of the foregoing tabulated information not only as the first candidate, but up to a predetermined prescribed number of candidates, by the operator operating the operation unit not shown, and a prescribed number of image forming apparatus candidates are preliminarily set as the destination of the foregoing tabulated information.

If the command acceptance unit 26 is configured with a setting for sending the foregoing tabulated information to the image forming apparatus 15, or to the image forming apparatus 15 and the device collective management server 5 based on the operator's command, the data transmission/reception unit 25 sends the foregoing tabulated information to the first candidate image forming apparatus as the destination of the tabulated information set in the command acceptance unit 26 (V15).

After sending the tabulated information to the foregoing first candidate image forming apparatus, the data transmission/reception unit 25 determines whether the sending of the foregoing tabulated information to the first candidate image forming apparatus was successful (whether an error occurred in the delivery processing) (V16). If the data transmission/reception unit 25 determines that the sending of the tabulated information to the first candidate image forming apparatus was unsuccessful (a delivery error has occurred) (YES at V16), the data transmission/reception unit 25 sets the second candidate image forming apparatus that is set in the command acceptance unit 26 as the destination of the foregoing tabulated information (V17), and sends the foregoing tabulated information to the second candidate image forming apparatus (V15).

The processing of V16 and V17 above is repeated until the sending of the tabulated information any one of the image forming apparatuses set as the destination of the foregoing tabulated information is successful (until a delivery error does not occur), and the processing is ended when the sending of the tabulated information to an image forming apparatus as the destination of the foregoing tabulated information is successful (NO at V16).

In the respective image forming apparatuses that were set as the destination of the foregoing tabulated information, if the data I/O unit receives the tabulated information made of the HTML format data, the control unit displays the received tabulated information made of the HTML format data on the display unit.

Another embodiment of the information processing apparatus, the data management program, and the data management system according to the present invention is now explained.

With the data management system 10 according to this other embodiment, the server computer SV2 creates display screen data for urging the operator to select whether to receive the foregoing tabulated information with the image forming apparatus 15 and sends this to the image forming apparatus 15, the image forming apparatus 15 displays the display screen showing the display screen data on the display unit 50, and sends a transmission request of the foregoing tabulated information to the server computer SV2 upon accepting a command from the operator to the effect of receiving the foregoing tabulated information with the image forming apparatus 15. Here, let it be assumed that the command acceptance unit 26 preliminarily stores the image forming apparatus 15 as the destination of the foregoing tabulated information.

Figure 6:
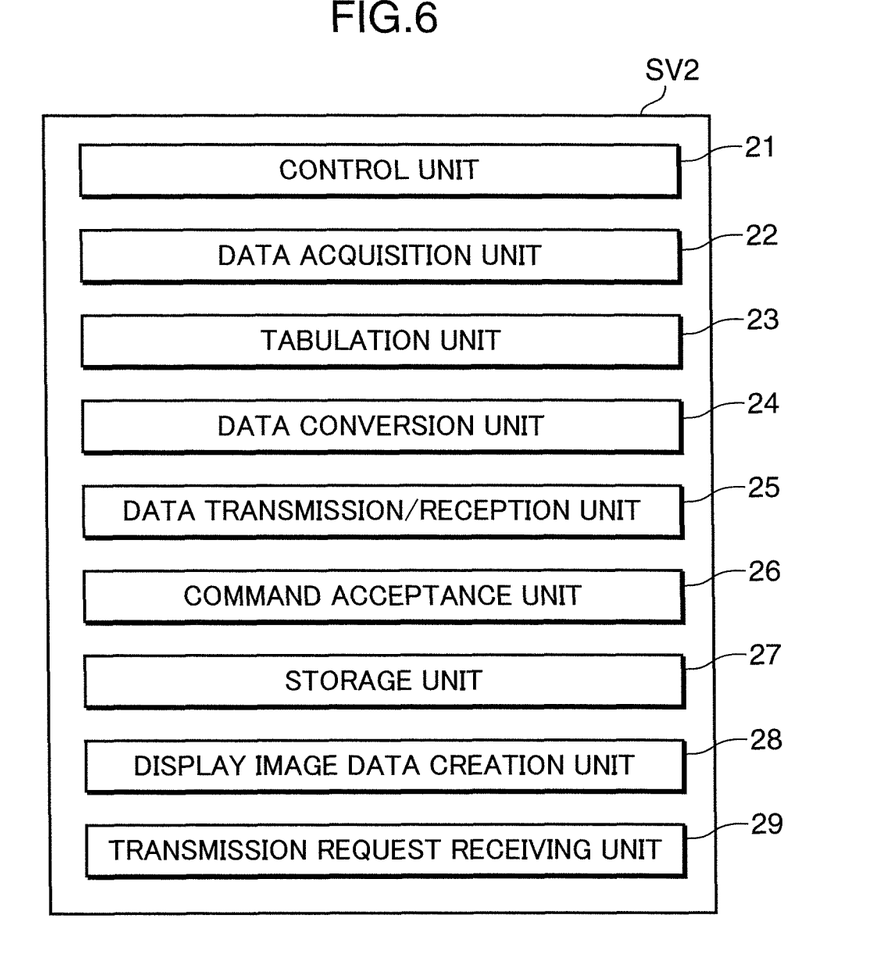
FIG. 6 is a block diagram showing another embodiment of a schematic configuration of the server computer.

FIG. 6 is a block diagram showing a schematic configuration of the server computer SV2 according to another embodiment. Explanation of the same configuration as the server computer SV2 shown in FIG. 2 is omitted.

The server computer SV2 according to this other embodiment further comprises a display screen data creation unit 28, and a transmission request receiving unit 29.

The display screen data creation unit 28 creates display screen data for urging the operator to select whether to receive the foregoing tabulated information, which is to be sent by the data transmission/reception unit 25, with the image forming apparatus 15. The display screen data creation unit 28 creates the display screen data in a data format (for instance, HTML format) that is displayable with the display unit 50 of the image forming apparatus 15.

The transmission request receiving unit 29 receives a transmission request of the foregoing tabulated information from the image forming apparatus 15. However, the function of the transmission request receiving unit 29 can also be concurrently carried out by the data transmission/reception unit 25.

The data transmission/reception unit 25 transmits the display screen data created with the display screen data creation unit 28 to the image forming apparatus 15.

Figure 7:
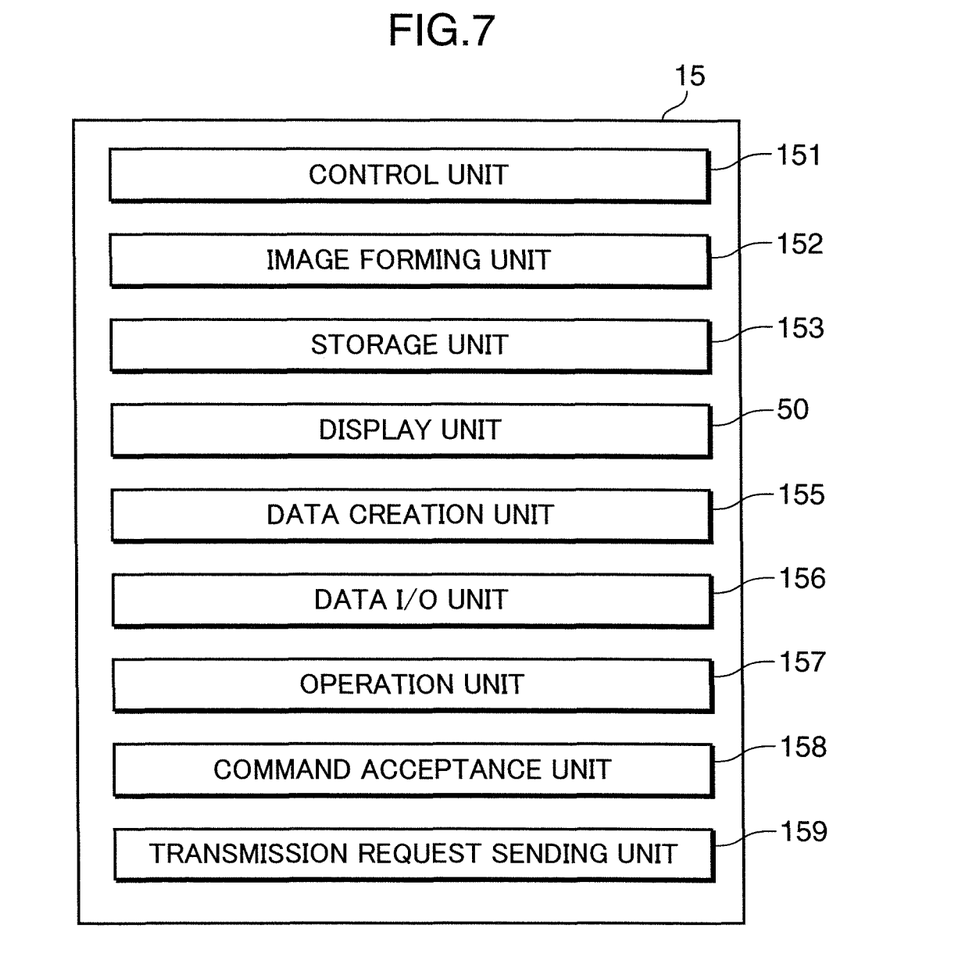
FIG. 7 is a block diagram showing another embodiment of a schematic configuration of the image forming apparatus.

FIG. 7 is a block diagram showing a schematic configuration of the image forming apparatus 15 according to another embodiment. Explanation of the same configuration as the image forming apparatus 15 shown in FIG. 3 is omitted.

The image forming apparatus 15 according to this other embodiment further comprises a command acceptance unit 158, and a transmission request sending unit 159.

The command acceptance unit 158 accepts a command that is input by the operator's operation based on the display screen that is displayed on the display unit 50 by the control unit 151 using the display screen data that is transmitted from the data transmission/reception unit 25 of the server computer SV2 and received by the data I/O unit 156; that is, a command to the effect of receiving the tabulated information with the image forming apparatus 15. For example, the command acceptance unit 158 accepts the foregoing command based on a touch panel function provided to the display unit 50.

The transmission request sending unit 159 sends a transmission request of the foregoing tabulated information to the server computer SV2 when the command acceptance unit 158 accepts the foregoing command. However, the function of the transmission request sending unit 159 may also be concurrently carried out by the data I/O unit 156.

Figure 8:
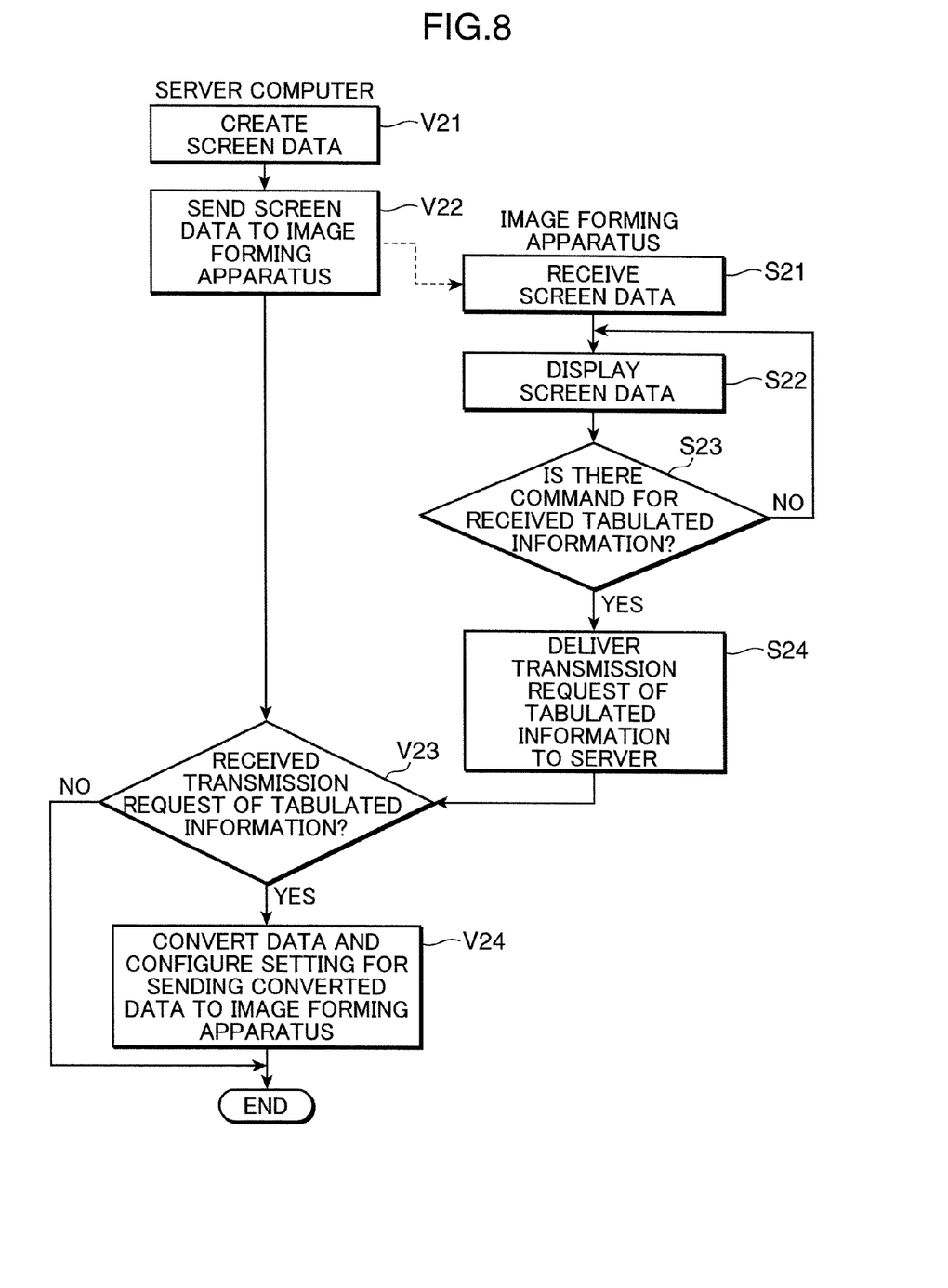
FIG. 8 is a flowchart showing the transmission request acceptance processing of the tabulation information and the transmission processing of the tabulated information in the server computer and the image forming apparatus of the data management system according to another embodiment.

FIG. 8 is a flowchart showing the transmission request acceptance processing of tabulated information and the tabulated information delivery processing in the server computer SV2 and the image forming apparatus 15 of the data management system 10 according to this other embodiment. Explanation of the same processing as the processing shown in FIG. 4 or FIG. 5 is omitted.

The processing shown in FIG. 8 is an embodiment of the processing of accepting the input of a command from the operator for converting the foregoing tabulated information into a prescribed data format and sending it to the image forming apparatus 15.

When the server computer SV2 is to perform processing for accepting from an operator an input of a command for selecting whether to perform the processing for converting the foregoing tabulated information into a prescribed data format (the display screen data in a data format (for instance, HTML format) that is displayable with the display unit 50 of the image forming apparatus 15) and sending it to the image forming apparatus 15, foremost, the display screen data creation unit 28 creates the display screen data for urging the operator to make the foregoing selection in a data format described above (V21).

The data transmission/reception unit 25 transmits the created display screen data to the image forming apparatus 15 (V22).

In the image forming apparatus 15, the data I/O unit 156 receives the display screen data from the data transmission/reception unit 25 of the server computer SV2 (S21). The control unit 151 displays the display screen showing the display screen data on the display unit 50 (S22).

When the control unit 151 is displaying the display screen on the display unit 50, if the command acceptance unit 158 accepts a command that is input by the operator's operation based on the display screen; that is, a command to the effect of receiving the foregoing tabulated information with the image forming apparatus 15 (YES at S23), the transmission request sending unit 159 sends a transmission request of the foregoing tabulated information to the server computer SV2 (S24). If the result is NO at S23, the processing of S22 is continued.

In the server computer SV2, when the transmission request receiving unit 29 receives the transmission request of the foregoing tabulated information from the image forming apparatus 15 (YES at V23), the command acceptance unit 26 accepts a command for converting the foregoing tabulated information into a prescribed data format and sending it to the image forming apparatus 15 according to the transmission request, and configures a setting for executing the conversion of the foregoing tabulated information into a prescribed data format and the transmission of the data converted tabulated information to the image forming apparatus 15 (V33). Here, let it be assumed that the command acceptance unit 26 preliminarily stores the image forming apparatus 15 as the destination of the foregoing tabulated information. If the result is NO at V23, the processing of V24 is not performed.

Consequently, if it is determined that a setting for converting the foregoing tabulated information into a prescribed data format and sending it to the image forming apparatus 15 has been configured in the command acceptance unit 26 at V3 of FIG. 4 according to the sequential processing shown in FIG. 4 (YES at V3), the data transmission/reception unit 25 transmits the foregoing tabulated information to the image forming apparatus 15.

According to the sequential processing shown in FIG. 8, with the image forming apparatus 15, in addition to the control unit 151 being able to display the foregoing tabulated information on the display unit 50, the control unit 151 is also able to manage the logs of the toner level, copy count information, jam count and the like regarding all network-connected image forming apparatuses 11 to 15 by using the foregoing tabulated information.

Note that the present invention can be modified into various forms without limitation to the configuration of the respective embodiments described above. The configuration and processing shown in FIG. 1 to FIG. 8 are merely exemplifications of the embodiments of the present invention, and do not intend to limit the present invention to the foregoing embodiments. For example, although the predetermined information of the claims was explained as maintenance information in each of the foregoing embodiments, the predetermined information is not limited to maintenance information, and may be other information.

In other words, the present invention is an information processing apparatus comprising a data acquisition unit which acquires data in Script format including predetermined information that has been output from each of one or more network-connected peripheral devices, a tabulation unit which extracts the predetermined information from the Script format data acquired by the data acquisition unit, and tabulates this extracted information; and a data conversion unit which converts the tabulated information that has been tabulated by the tabulation unit into a predetermined data format which is interpretable by a device that is different from the information processing apparatus and which is different from the Script format.

The present invention is additionally a computer-readable storage medium recorded with a data management program which causes an information processing apparatus that is network-connected to each of one or more peripheral devices to function as: a data acquisition unit which acquires data in Script format that has been output from each of the peripheral devices; a tabulation unit which extracts predetermined information from the Script format data acquired by the data acquisition unit, and tabulates this extracted information; and a data conversion unit which converts the tabulated information that has been tabulated by the tabulation unit into a predetermined data format which is interpretable by a device that is different from the information processing apparatus and which is different from the Script format.

With the conventional image forming system described in the Description of the Background Art, information such as the maintenance information (toner level, copy count information, jam count, etc.) of the respective image forming apparatuses is not centrally controlled with the server computer, nor is the foregoing maintenance information made available in a separate apparatus that is different from the server computer.

Meanwhile, with the present invention, since the tabulation unit sets the Script format data that was acquired from the respective peripheral devices with the data acquisition unit as the target of tabulation processing, predetermined information can be extracted and tabulated from the data that was acquired from the respective peripheral devices. Moreover, since the data conversion unit converts the tabulated information that was tabulated with the tabulation unit into a predetermined data format that is different from the Script format and which is interpretable by an apparatus (for instance, a peripheral device) that is different from the information processing apparatus, the foregoing tabulated information is made available to the foregoing different apparatus.

Consequently, according to the present invention, information such as the maintenance information of peripheral devices such as the image forming apparatuses can be centrally controlled with an information processing apparatus such as a server computer, and such information is also made available to an apparatus (for instance, a peripheral device) that is different from the information processing apparatus.

Moreover, with the present invention, the data conversion unit performs data conversion of a data format that is interpretable by a server application loaded in a specific network-connected server as the predetermined data format, a data transmission unit being further provided which transmits data that has been converted by the data conversion unit to the server.

According to this invention, since the data conversion unit converts the tabulated information in Script format that was tabulated with the tabulation unit into a data format that is interpretable by a specific network-connected server, the foregoing tabulated information is made available to the server.

Moreover, the present invention further has a command acceptance unit which accept, from an operator, an input of a command for selecting whether to perform data conversion by the data conversion unit and data transmission by the data transmission unit; and a control unit which causes the data conversion unit to perform data conversion and the data transmission unit to perform data transmission if the command acceptance unit accepts a command for performing the data conversion and the data transmission, and causes the data conversion unit to refrain from performing data conversion and the data transmission unit to refrain from perform data transmission when the command acceptance unit does not accept the command.

According to this invention, since the control unit controls whether to cause the data conversion unit to perform data conversion and the data transmission unit to perform data transmission according to the contents of an operator's command that was accepted by the command acceptance unit, the operator is able to select, as intended, whether to cause the information processing apparatus to perform the foregoing data conversion and data transmission by properly setting the command to be input into the command acceptance unit regarding whether or not to perform the foregoing data conversion and data transmission.

Moreover, with the present invention, the data conversion unit performs data conversion of an HTML data format that is displayable by a display unit of a network-connected peripheral device as the predetermined data format, a data transmission unit being provided which transmits data that has been converted by the data conversion unit to a predetermined peripheral device including the display unit among the peripheral devices.

According to this invention, since the data conversion unit converts the tabulated information in Script format that was tabulated with the tabulation unit into an HTML data format that is displayable with a display unit of a network-connected peripheral device, the foregoing tabulated information can be displayed on the display unit of the peripheral device.

Moreover, with the present invention, the data transmission unit determines whether data transmission to the predetermined peripheral device is possible, and sends the converted data to a predetermined different peripheral device including the display unit among the network-connected peripheral devices, upon determining that data transmission to the peripheral device is not possible.

According to this invention, since the data conversion unit converts the tabulated information in Script format that was tabulated with the tabulation unit into an HTML data format that is displayable with a display unit of a network-connected peripheral device, the data transmission unit will determine that data transmission to the predetermined peripheral device is not possible and send the foregoing converted data to a different peripheral device. Thus, the tabulated information that was tabulated with the tabulation unit can be displayed on the display unit of such different peripheral device.

Moreover, the present invention further comprises a display screen data creation unit which creates display screen data for urging an operator to select whether to receive, by the predetermined peripheral device, the converted data to be transmitted from the data transmission unit in a data format that is displayable on the display unit of the predetermined peripheral device; and a transmission request receiving unit which receives, from the predetermined peripheral device, a transmission request for the converted data from the data transmission unit, wherein the data transmission unit transmits the display screen data created by the display screen data creation unit to the peripheral device, and additionally sends the converted data to the predetermined peripheral device on the basis that the transmission request receiving unit receives the transmission request for the converted data.

According to this invention, the operator is able to select, with the peripheral device, whether to receive the converted data to be transmitted from the data transmission unit with the predetermined peripheral device.

The present invention is additionally a data management system comprising one or more peripheral devices and an information processing apparatus that is network-connected to the peripheral devices, wherein each of the peripheral devices has a data creation unit which creates predetermined information as data in Script format, and a data output unit which outputs the Script format data that has been created by the data creation unit, the information processing apparatus has a data acquisition unit which acquires data in Script format that has been output from the peripheral devices, a tabulation unit which extracts predetermined information from the Script format data acquired by the data acquisition unit, and tabulates this extracted information, a data conversion unit which converts the tabulated information that has been tabulated by the tabulation unit into an HTML data format that is displayable by a display unit of the peripheral devices, and a data transmission unit which transmits data that has been converted by the data conversion unit to a predetermined peripheral device including the display unit among the peripheral devices, and wherein the predetermined peripheral device has a data receiving unit which receives the converted data transmitted from the information processing apparatus, and a display control unit which displays the converted data that has been received by the data receiving unit on the display unit.

According to this invention, since the data conversion unit converts the tabulated information in Script format that was tabulated with the tabulation unit into an HTML data format that is displayable with a display unit of a network-connected peripheral device, the foregoing tabulated information can be displayed on the display unit of the peripheral device. Consequently, the administrator of the site where the data management system is installed will be able to learn information regarding the respective peripheral devices that are network-connected to the information processing apparatus merely by viewing the display unit of a peripheral device without having to operation a personal computer or the like.

Moreover, with the data management system according to the present invention, the information processing apparatus further comprises: a display screen data creation unit which creates display screen data for urging an operator to select whether to receive, by the predetermined peripheral device, the converted data to be transmitted from the data transmission unit in a data format that is displayable by the display unit of the predetermined peripheral device; and a transmission request receiving unit which receives, from the predetermined peripheral device, a transmission request for the converted data from the data transmission unit, the data transmission unit transmits the display screen data created by the display screen data creation unit to the peripheral device, and additionally sends the converted data to the predetermined peripheral device on the basis that the transmission request receiving unit receives the transmission request of the converted data, a predetermined peripheral device among each of the peripheral devices has the display unit, the data receiving unit receives the display screen data that is transmitted from the data transmission unit of the information processing apparatus, and the display control unit displays a display screen according to the display screen data that has been received by the data receiving unit on the display unit, the predetermined peripheral device further comprising: a command acceptance unit which accepts a command for receiving the converted data by the peripheral device that is input based on an operator operation based on the display screen that is displayed on the display unit by the display control unit; and a transmission request sending unit which sends the transmission request for the converted data to the information processing apparatus when the command acceptance unit accepts the command.

According to this invention, the operator is able to select, with the peripheral device, whether to receive the converted data to be transmitted from the data transmission unit with the predetermined peripheral device.

This application is based on Japanese Patent application serial No. 2009-225153 filed in Japan Patent Office on Sep. 29, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A data management system comprising:
a plurality of image forming apparatuses and an information processing apparatus that is network-connected to the plurality of image forming apparatuses,
each of the plurality of image forming apparatuses having a data creation unit that acquires maintenance information and creates the maintenance information as data in Script format when performing an image forming operation, and a data output unit that outputs the Script format data that has been created by the data creation unit,
the information processing apparatus having: an operation unit, a first command acceptance unit that receives a command for setting one of the image forming apparatuses as a destination among the plurality of image forming apparatuses as a result of an operator operating the operation unit, and preliminarily sets the command of the image forming apparatus as the destination, a data acquisition unit that acquires the data in Script format that has been output from the each of the plurality of image forming apparatuses, a tabulation unit that extracts predetermined information about all of the plurality of image forming apparatuses from the Script format data acquired by the data acquisition unit, and tabulates this extracted predetermined information to produce tabulated information, a data conversion unit that converts the tabulated information about all of the plurality of image forming apparatuses that has been tabulated by the tabulation unit into an HTML data format to produce converted data that is displayable by a display unit of the image forming apparatus that has been set as the destination, a data transmission unit that transmits the converted data that has been converted by the data conversion unit to the image forming apparatus that has been set as the destination, a display screen data creation unit that creates display screen data for urging an operator to select whether to receive, by the image forming apparatus that has been set as the destination, the converted data to be transmitted from the data transmission unit in a data format that is displayable by the display unit of the image forming apparatus that has been set as the destination, and a transmission request receiving unit that receives, from the image forming apparatus that has been set as the destination, a transmission request for the converted data from the data transmission unit, and the image forming apparatus that has been set as the destination having a data receiving unit that receives the converted data transmitted from the information processing apparatus, a display control unit that displays the tabulated information about all of the plurality of image forming apparatuses indicated by the converted data that has been received by the data receiving unit on the display unit, a second command acceptance unit that accepts a command for receiving the converted data that is input based on an operator operation based on the display screen that is displayed on the display unit by the display control unit, and a transmission request sending unit that sends the transmission request for the converted data to the information processing apparatus when the second command acceptance unit accepts the command, wherein the data transmission unit transmits the display screen data created by the display screen data creation unit to the image forming apparatus that has been set as the destination, and additionally sends the converted data to the image forming apparatus that has been set as the destination on the basis that the transmission request receiving unit receives the transmission request of the converted data, the data receiving unit receives the display screen data that is transmitted from the data transmission unit of the information processing apparatus, and the display control unit displays a display screen according to the display screen data that has been received by the data receiving unit on the display unit.

2. The data management system according to claim 1,
wherein the data management system further comprises a mail server,
the data output unit in each of the plurality of image forming apparatuses transmits the Script format data to the mail server,
the information processing apparatus acquires the Script format data that is output from each of the plurality of image forming apparatuses via the mail server.

3. The data management system according to claim 1,
wherein the data conversion unit performs data conversion of a data format that is interpretable by a server application loaded in a specific network-connected server as the predetermined data format, and
wherein the data transmission unit transmits to the server data that has been converted by the data conversion unit.

4. The data management system according to claim 1,
wherein the first command acceptance unit can accept, from an operator, an input of a command for selecting whether to perform data conversion by the data conversion unit and data transmission by the data transmission unit; and
the information processing apparatus further comprises a control unit that causes the data conversion unit to perform data conversion and the data transmission unit to perform data transmission if the first command acceptance unit accepts a command for performing the data conversion and the data transmission, and causes the data conversion unit to refrain from performing data conversion and the data transmission unit to refrain from performing data transmission when the first command acceptance unit does not accept the command.

5. A data management system comprising:
a plurality of image forming apparatuses and an information processing apparatus that is network-connected to the plurality of image forming apparatuses,
wherein each of the plurality of image forming apparatuses has a data creation unit that acquires maintenance information and creates the maintenance information as data in Script format when performing an image forming operation, and a data output unit that outputs the Script format data that has been created by the data creation unit,
the information processing apparatus has an operation unit, a first command acceptance unit that receives a command for setting one of the image forming apparatuses as a destination among the plurality of image forming apparatuses as a result of an operator operating the operation unit, and preliminarily sets the command of the image forming apparatus as the destination, a data acquisition unit that acquires the data in Script format that has been output from the each of the plurality of image forming apparatuses, a tabulation unit that extracts predetermined information about all of the plurality of image forming apparatuses from the Script format data acquired by the data acquisition unit, and tabulates this extracted predetermined information to produce tabulated information, a data conversion unit that converts the tabulated information about all of the plurality of image forming apparatuses that has been tabulated by the tabulation unit into an HTML data format to produce converted data that is displayable by a display unit of the image forming apparatus that has been set as the destination, and a data transmission unit that transmits the converted data that has been converted by the data conversion unit to the image forming apparatus that has been set as the destination,
the image forming apparatus that has been set as the destination has a data receiving unit that receives the converted data transmitted from the information processing apparatus, and a display control unit that displays the tabulated information about all of the plurality of image forming apparatuses indicated by the converted data that has been received by the data receiving unit on the display unit,
the first command acceptance unit accepts a first candidate and a second candidate as the image forming apparatus that is to be set as the destination from the plurality of image forming apparatuses, and
the data transmission unit determines whether data transmission to the first candidate is possible, and sends the converted data to the second candidate, upon determining that data transmission to the first candidate is not possible.

* * * * *